United States Patent [19]
Monroe et al.

[11] Patent Number: 5,976,363
[45] Date of Patent: Nov. 2, 1999

[54] COMPACT WATER-CONSERVING KITCHEN WATER STATION WITH SINK FOR SUPPLYING COPIOUS PURIFIED WATER, PARTICULARLY FOR RESTAURANTS

[76] Inventors: Jerry Monroe, 7405 W. Banff La., Peoria, Ariz. 85381; Wayne Windenburg, 3240 E. Desert Cove, Phoenix, Ariz. 85028

[21] Appl. No.: 08/729,772

[22] Filed: Oct. 11, 1996

[51] Int. Cl.⁶ .............. B01D 17/12; B01D 61/10
[52] U.S. Cl. .............. 210/90; 99/357; 210/109; 210/137; 210/257.2; 210/258; 222/189.06
[58] Field of Search ............... 210/86, 90, 109, 210/110, 134, 137, 248, 257.1, 257.2, 258, 259, 416.1, 416.3, 541, 542, 104; 222/146.1, 189.06; 99/357

[56] References Cited

U.S. PATENT DOCUMENTS

| | | |
|---|---|---|
| 3,207,282 | 9/1965 | Norris . |
| 3,856,676 | 12/1974 | Grimme et al. ............ 210/257.2 |
| 4,160,727 | 7/1979 | Harris ........................ 210/257.2 |
| 4,670,144 | 6/1987 | McCausland et al. ......... 210/542 |
| 4,801,375 | 1/1989 | Padilla ........................ 210/257.2 |
| 5,064,097 | 11/1991 | Brog et al. .................. 222/146.1 |
| 5,112,477 | 5/1992 | Hamlin ....................... 210/257.1 |
| 5,445,729 | 8/1995 | Monroe et al. ............... 210/257.2 |
| 5,484,538 | 1/1996 | Woodward .................. 210/257.1 |
| 5,573,142 | 11/1996 | Morellato et al. ........... 222/146.1 |
| 5,582,717 | 12/1996 | Disanto ...................... 210/257.2 |
| 5,766,453 | 6/1998 | Morellato et al. ........... 210/257.2 |

*Primary Examiner*—Joseph W. Drodge
*Attorney, Agent, or Firm*—Fuess & Davidenas

[57] ABSTRACT

A water station, or cabinet, or console, particularly for use in kitchens and in restaurant kitchens and in oriental restaurant kitchens, contains (i) a reverse osmosis system, and (ii) a sink. The water cabinet dispenses copious amounts of (i) water purified by reverse osmosis ("RO water"), as well as (ii) tap, or supply, water and (iii) waste water from the reverse osmosis (RO) process, respectively from three faucets in position over the sink. The cabinet is compact: it fits within the footprint of, and replaces, a conventional restaurant sink. The RO water purification performed by the RO system completely within the cabinet is water-conserving, typically producing RO purified water and waste water at a ratio as low as one-to one (1:1) by using an adjustable feedback path for waste water. Operational status is clearly visible. Maintenance is easy, with sediment filters replaceable on-line. RO purified water is supplied to external devices, including "rice robots" and auxiliary purified water storage tanks, by plumbed connections.

16 Claims, 6 Drawing Sheets

COMPACT WATER-CONSERVING KITCHEN WATER STATION WITH SINK FOR SUPPLYING COPIOUS PURIFIED WATER, PARTICULARLY FOR RESTAURANTS

BACKGROUND OF THE INVENTION

1. Field of the Invention

The present invention generally concerns the organization, packaging and optimization of reverse osmosis water purification systems, particularly for installation and use in kitchens, particularly including restaurant kitchens.

The present invention particularly concerns water stations, or cabinets, or consoles incorporating both (i) a reverse osmosis water purification system and (ii) a sink.

The present invention further particularly concerns a reverse osmosis system having both an atmospheric storage tank completely contained in a cabinet, and a pressurized auxiliary storage tank remote from the cabinet, for storing purified water.

The present invention still further particularly concerns a reverse osmosis system having quick-change sediment filters that are changeable while the system is operating.

2. Description of the Prior Art 2.1 An Increasing Need for Purified Water in Cooking, Particularly in Oriental Cooking, Particularly of Rice, Including in the Orient As world population density and industrial activity simultaneously increase, ever greater amounts of ever more marginally impure water is required to be rendered potable for human use, including use in cooking, by water treatment. Even advanced industrial societies have been forced by ever increasing demands for potable water into the capture and use of marginal surface and subsurface waters that require extensive purification treatments. These treatments, most notably including chlorination, may impart a slight taint, or taste, to the water so treated. Although these treated waters are presently presumed safe for human consumption, they may impart a slightly undesirable taste to foods when used in cooking.

In some more affluent areas of the world, including in the United States, the use of bottled water both for cooking and for consumption by ingestion (i.e., drinking and the eating of re-hydrated foodstuffs) has become common in some areas, especially in those areas where local natural waters retain a pronounced taint even after treatment. According to the International Bottled Water Association based in Virginia, U.S.A., the United States national consumption of bottled water increased from 1.1 billion gallons in 1985 to 2.7 billion gallons in 1995. The consumption is, however, regionally very uneven. California alone consumed 788.2 million gallons of bottled water in 1995. Some consumption of bottled water is attributed to motivations, such as fashion, other than (i) necessity, (ii) taste, or (iii) health. However, there is ample evidence that at least a wealthy society (such as the U.S.) will sometimes, and in some places, pay handsomely for pure water, even to the astronomical levels (in California, U.S.A., circa 1996) of paying twice as much for a liter of water as for a liter of gas.

Appreciation of pure water is not limited to wealthy, nor to occidental, societies. Indeed, western, or occidental, cuisine is generally not so water intensive as is oriental cuisine, especially such oriental cuisine as is based on the consumption of rice. It will, of course, be recognized that a greater portion of the world's people subsist primarily on rice than on any other grain. In particular, more than fifty liters (50 l.) of water may be used in the preparation and cooking of a single (one) kilogram of rice. Other major oriental foods such tea, soups and tempura batter also use large amounts of water. This copious use of water in the preparation of rice, and of other foods, in oriental cooking effectively precludes any cost-effective usage of bottled water.

Nonetheless to a lack of any appreciable use of bottled water in the home and commercial kitchens of the orient, it has as of late been recognized that the quality of municipal waters in the major cities of, for example and most notably, Japan has, despite water treatments of the most advanced order producing water of undisputed safety for human consumption, presently arrived at a level where taste components of treated water can at least be detected (if not directly tasted, or distinguished, or identified) in cooked foods, notably rice. The Japanese, in particular, are very fastidious about the quality of their rice, paying significantly premium prices for the finest grains. It is obvious that the taste of even the finest rice can be impaired if the rice is cooked in water that imparts any undesired tastes.

According to the recognition that the cooking of rice could be improved, at least in selected areas of present day metropolitan Japan, by the use of purer water, Mr. John Lai of Tokyo, Japan, has reportedly proceeded to the investigation of, and to the filing(s) of the application(s) for patent(s) on, improved methods for the cooking of rice using, at least in part, water that is purified by process of reverse osmosis.

It has been, in particular, the insight of Mr. Lai that the first washing of uncooked, natural, rice should transpire with purified water—such as is preferably obtained by process of reverse osmosis conducted on municipal supply water. A normal second and third washings of the rice then preferably transpire by use of only normal, tap, water or, at most, by use of filtered tap water. Finally, the washed rice is preferably cooked in water that is again purified by process of reverse osmosis.

The utility in using purified, reverse osmosis, water ("RO water") in the first and last steps is to both initially, and finally, permeate the rice grains with the purest water available. Intermediary steps are less critical, and are suitably conducted with tap water (or filtered tap water) to avoid the water wastage attendant upon the production of purified water by process of reverse osmosis.

The rice so washed and cooked is reportedly of a detectably better quality than is rice washed and cleansed solely by the use of municipal, tap, water (at least in certain areas of Japan where tens if not hundreds of millions of people live and eat). The superior quality of this rice is of particular concern to (Japanese) restaurants, which understandably wish to compete for their discriminating clientele by offering cooked rice—a universally-recognized and appreciated basic food—of the best quality possible.

Preliminary indications are that the clientele of at least one Tokyo restaurant operated by Mr. Lai may have ratified their approval of rice prepared with water purified by process of reverse osmosis in a most profound way: they eat more of it. Indeed, indications are that the ratio of the restaurant consumption of rice prepared with purified water to rice not so prepared is unexpectedly high (at least in Tokyo, Japan), and may be as high as several times greater.

Additionally, there have been unexpected indications that some foods prepared with purified water, notably tempura batter, may have a longer usable life, and may correspondingly be prepared in larger batches with increased efficiency, when made with purified water. Food chemistry is complex, and it is uncertain as to what effect is being observed, and to what magnitude and consequence, during the use of purified water particularly in oriental cooking. However, it goes without saying that few, or no, recipes call for the intentional addition of calcium carbonate, or other metals and minerals removed from water by reverse osmosis, to foods during cooking. It therefore makes some sense, which is presently in process of investigation, that the use of pure water may have unexpected beneficial consequences (other than just taste) to the preparation of food.

Nonetheless to the desirability of using water that is purified by reverse osmosis in the (i) washing and (ii) cooking of rice in Japanese restaurants, use of reverse osmosis (RO) water incurs at least two challenges. First, the total amount of water used in the preparation of one liter (1 l.) of rice by partial use of purified RO water is even higher than the normal large amount. Commonly ten liters (10 l.) of purified, RO, water plus eighty liters (80 l.) of tap water, or a total of ninety liters (90 l.) of municipal water, are used in the washing and cooking of each liter (1 l.) of rice. Second, the home and restaurant kitchens of Japan are exceedingly small by occidental standards, and there is scant room for the installation of any reverse osmosis water purification system having the desired capacity.

It will be recognized that the challenges of volume delivery of pure water, and accommodation to existing restaurant kitchens, that may be most acute in oriental kitchens are not limited to these kitchens. Indeed, occidental cuisine can also benefit from the use of pure water in cooking, and space is also at a premium in existing occidental restaurant kitchens which are generally compactly laid out (as are oriental kitchens) for reasons of operational efficiency.

2.2 A Desirable Integration of A Reverse Osmosis Water Purification System Into the Crowded Kitchens of, Inter Alia, the Orient and Japan, and, in Particular, Into the Existing Kitchens of Oriental Restaurants, Is Challenging The reverse osmosis system of the present invention will be seen to be unique for being suitably retro-fitted to existing kitchens, particularly restaurant kitchens and more particularly the crowded kitchens of oriental restaurants including as exist, inter alia, in the orient, and most notably in Japan.

The biggest problem faced with installing any new equipments, including reverse osmosis system equipments, in such existing oriental kitchens is space. As the awareness for the need for water purification in the Japanese restaurant industry grows, the motivation of restaurant owners and operators to install a reverse osmosis water purification system is expected to increase to considerable levels. However, the installation of a restaurant RO system is often strongly limited by the existing physical constraints of the restaurant's kitchen, and of its plumbing (and, to a lessor extent, its electrical wiring). Even should room for a RO system be found in a restaurant kitchen, access to the installed RO system for purpose of maintenance must be provided.

It will momentarily be seen the present invention adopts a usage, particularly in restaurant applications, of the existing volume, and of a part of the "air space", normally occupied by the kitchen sink. Every kitchen must have a sink to wash hands, rinse vegetables, wash pots and pans, etc. It will momentarily be seen that, in accordance with the present invention, a RO water purification system and a sink are combined to accomplish both the (i) water supply, including a purified water supply, and the (ii) sink, needs of a restaurant kitchen.

It will momentarily further be seen that the unique design of the combined sink and RO system of the present invention will, while performing a substantially normal process of water purification by process of reverse osmosis, occupy as much as six to eight cubic feet (6–8 ft$^3$) less volume than would normal RO system equipments. Such normal RO system equipments would include, as separate parts, any of (i) one or more sediment filters, (ii) one or more carbon filters (of wall mount or of floor mount design), (iii) one or more reverse osmosis membranes, (iv) a purified water storage tank (either atmospheric or pressurized), and (v) a RO water delivery system. Any RO system must also include piping or tubing to connect all of the component pieces together so as to make the RO system functional.

The preferred embodiment of a combined (i) RO water purification, and (ii) sink, system of the present invention will momentarily be seen to realize, by very judicious and creative tight packaging, both the functions of (i) pure water supply, and (ii) used water evacuation, in a single cabinet. The preferred cabinet does not, by and large, take up any more nor any additional floor space, and occupies but only modestly more volume, than is presently occupied by a restaurant sink and its associated plumbing and support structure. The water station, or cabinet, or console, of the present invention can typically be installed into the existing volume of a sink, particularly the typically large sink of a restaurant.

2.3 A Reverse Osmosis Water Purification System Integrated Into a Kitchen Would Desirably Not Waste Water A reverse osmosis water purification system integrated into an oriental restaurant kitchen would normally be used to produce copious amounts of purified water, typically up to eight hundred gallons (800 gal., or 3061 liters) per day. Such a system would desirably not waste water. Wastage of water is, by and large, a function of two different criteria: 1) how much water it takes to make each unit volume of the purified, RO, water, and 2) any usage that is made, or that can be made, of the RO waste water.

Considering the first criteria, the RO system in accordance with the present invention will momentarily be seen to employ such a diversion of waste water back into the purification cycle as ultimately supports a very high ratio of one to one (1:1) between the produced purified RO water and the waste water. Although such a "re-circulation" path is known, its (i) components, and (ii) required plumbing, in the system of the present invention are to some degree in tension with the requirement of the system to be packaged as extremely compactly as is possible.

Considering the second criteria, a RO water purification system must normally flow connect across an air gap (as is mandated both by plumbing codes and by good plumbing practices) to a drain for the evacuation of waste water. It will momentarily be seen that the RO system in accordance with the present invention will, when installed in the space conventionally occupied by a sink, suitably use the existing drain connection (as well as the incoming water supply) of the sink. This usage will, however, present certain challenges that have, as will shortly be seen, to do primarily with the prevention of any back-up of effluent into the RO system.

The rewards of routing RO waste water to the sink are, however, very great. The RO waste water can readily be used for things like thawing fish, thawing frozen products, rinsing vegetables, etc. It will be seen that, in the preferred embodiment of the present invention, it is sufficient merely to turn on a faucet valve on a console, or cabinet, in order to divert RO waste water into a sink for the above, and for other, purposes. Indeed, even the RO waste water will already have been filtered throughout both a sediment filter and a carbon filter, and—although containing such heavy materials as will not pass through an RO membrane—this "waste" water remains eminently useful for the above applications.

2.4 Integration of A Reverse Osmosis Water Purification System Into the Kitchen of the Future It is desirable that a new embodiment of a reverse osmosis system suitably retro-fitted to existing kitchens, including the kitchens of restaurants, should be susceptible of integration with other equipments, and future equipments, of the kitchen. A new kitchen reverse osmosis water purification system should, as a minimum, be highly compatible with such other kitchen equipments as may required either the purified water or, more rarely, the waste water, that is produced by the RO system.

An example of such a device is the relatively new so-called "rice robot" for use in the kitchens of oriental restaurants. These "rice robots" are free-standing electrically-operated high-volume rice preparation and cooking appliances of considerable size and sophistication. They typically cost some tens of thousands of dollars U.S. each, circa 1996.

A "rice robot" typically serves to impeccably cleanse and cook successive batches each of some several liters of rice as is appropriate for, among other mass food service applications, oriental restaurants. Such modern (circa 1996) "rice robots" are sold, for example, by Kubota of Japan as models KR4501S and KR7201S. A very large, and economically significant, number of these units have reportedly been sold, reportedly more than twenty thousand (20,000).

These "rice robots" use the full normal amount of water required in the cleansing and cooking of rice. In accordance with the explanation in the preceding section 2.1 that this water should in certain portions of the process desirably be purified water, these modern machines are desirably suitably flow connected to the RO purified water supply of a modern (oriental) kitchen water station, or cabinet, or console. They are so connected in accordance with the present invention.

Yet another requirement for kitchen-wide integration of water services involves the occasional desire, or necessity, to store more purified RO water than may possibly be contained within such a (necessarily) small storage tank as is contained internally within the cabinet of a water station that fits within the modest volume of a wink—as will seen to be the case with the water station cabinet of the present invention. Accordingly, some accommodation of a modern kitchen water station to storing purified, RO, water in an auxiliary, remote, storage tank would be desirable.

It will momentarily be seen that the RO system in accordance with the present invention has a sophisticated in-unit, and external, water delivery system. From a storage tank built into the unit (in a position that will be seen be under a sink, and inside a cabinet), purified RO water will be seen to be deliverable out of either of two flow ports to any of a variety of other equipments and/or applications. For example, one of the output purified water ports can be routed to an additional pressurized storage tank for providing a backup supply of purified RO water, or for keeping additional water on hand in order to support more and/or different uses of the purified RO water.

2.5 Water Purified by Reverse Osmosis Substantially Alleviates the Precipitation of Calcium Deposits Onto Equipments Using the Purified Water The aforementioned "rice robot" suffers greatly from calcium deposits precipitated from heated water. Similarly, steam tables, ice machines, steamers, proofing ovens and similar kitchen, restaurant and food service appliances—particularly as may use heated water, and as are predominantly used in the occident—are also subject to unsightly, and potentially functionally deleterious, deposits of calcium carbonate, or lime, from (heated) water.

Water purified by reverse osmosis substantially alleviates the precipitation of calcium deposits onto equipments using the purified water. Accordingly, the selective use of purified water in a kitchen offers advantages to machine function as well as to human taste.

2.6 A Kitchen Reverse Osmosis Water Purification System Would Desirably be Fool-Proof in Safety of Operation, Highly Reliable, and Easily Maintainable It will momentarily be seen that the RO system in accordance with the present invention is operator-friendly, clearly indicating its operational status while being simply and straightforwardly controlled. The system is intrinsically safe not only in the RO process performed, but also in strict avoidance of any failure modes that might serve, as an ultimate negative consequence, to produce any output water (waste water as well as purified water) that had somehow been rendered unsafe, such as from an occurrence of bacterial growth.

Finally, the water station in accordance with the present invention will be seen to be highly maintainable. The preferred system will shortly be seen to have, for example, dual sediment filters with a diverter valve assembly. During processing water passes through a sediment filter which, after a period of time, gets dirty and clogged, slowing the flow of water. The RO water station and system in accordance with the present invention then permits, when the sediment filter gets dirty or clogged, that a valve between the two sediment filters should be manually turned, switching the system on-line to a clean sediment filter. The dirty sediment filter may then be changed without shutting down the system, and while the system remains running.

SUMMARY OF THE INVENTION

The present invention contemplates a water station, or cabinet, or console, particularly for use in kitchens and in restaurant kitchens and in oriental restaurant kitchens. The water cabinet contains (i) a reverse osmosis system, and (ii) a sink. It dispenses copious amounts of (i) water purified by reverse osmosis ("RO water") as well as (ii) tap, or supply, water and (iii) waste water from the reverse osmosis (RO) process from three faucets in position over the sink.

The preferred water cabinet is compact: it fits within the footprint of, and replaces, a conventional restaurant sink. The RO water purification performed by the RO system entirely within the cabinet is water-conserving, typically producing RO purified water and waste water at a ratio as low as one-to one (1:1).

Status of the RO system is highly visible. Maintenance of the RO system is easy, with sediment filters replaceable on-line. RO purified water is supplied from the water cabinet to external devices, including to "rice robots" and to auxiliary purified water storage tanks, by plumbed connections.

1. A Complete Reverse Osmosis System in a Cabinet Having a Sink

In one of its aspects, the present invention may be considered to concern the packaging and accommodation of a complete reverse osmosis system to the existing physical and plumbing and electrical environment of a kitchen, particularly a restaurant kitchen.

In this aspect the invention is embodied in a kitchen water station receiving supply water. The station includes at least a reverse osmosis system that itself includes at least one filter of received supply water, at least one reverse osmosis membrane receiving the filtered supply water for producing both reverse osmosis purified water and waste water, and a storage tank for storing purified water received from the at least one membrane.

The water station further includes a cabinet that is partitioned in three portions. An uppermost, top, portion contains at least a portion of the filter. A middle portion, contains at least a portion of the at least one reverse osmosis membrane. Finally, a bottom portion (i) contains at least a portion of the storage tank, and (ii) defines in a portion of its uppermost surface a sink basin.

A first faucet is flow connected to the at least one reverse osmosis membrane for dispensing waste water over the sink basin while a second faucet is flow-connected to the storage tank for dispensing purified water over the sink basin.

Preferably, yet a third faucet is flow-connected to the supply water for dispensing supply water over the sink basin.

Each of the first, the second, and the third faucets are preferably mounted to the middle portion of the cabinet, the upper surface of the sink basin defined by the lower portion of the cabinet remaining unobstructed.

The RO system normally further includes a booster pump for boosting the pressure of the supply water before its delivery to the reverse osmosis membrane(s), and the cabinet's middle portion contains at least a portion of this booster pump.

The RO system normally still further includes a delivery pump for pressuring purified water received from the membrane(s) for storage under pressure in the storage tank. In this case the cabinet's bottom portion contains at least a portion of this delivery pump.

In the preferred embodiment of the invention up to 50% recovery of waste water—not including the using of the above described feature of using the waste water faucet—is obtained by recirculation of a portion of the waste water. The overall water purification ratio obtained is accordingly as high as one-to-one (1:1) purified water to waste water—an important consideration where water must be conserved.

The preferred embodiment of the invention has a high purified water production capacity, typically from 600 to 1000 gallons daily.

The preferred embodiment of the invention is preferably housed in a three-level cabinet that is preferably entirely constructed of stainless steel. The preferred embodiment of the cabinet has opening, cabinet-style, doors that permit easy access to the system for regular maintenance and servicing.

System operational status is clearly displayed in the preferred embodiment. Replaceable sediment filters are located behind a viewing window. Incoming, and back, water pressure across the reverse osmosis membrane(s) is (are) displayed in liquid-filled pressure gauges. A red indicator light serves as an indication that an atmospheric storage tank of purified RO water is empty.

The preferred embodiment of the invention is easy to install, including by retrofit to the existing location of a restaurant sink. The unit is simply plumbed to the cold water supply, with an outlet for the sink run to a drain line. The unit receives a.c. power through a plug connection. No messy sweating of pipe fixtures or electrical work is required. The installed unit has no unsightly, space-taking, equipment in view. It instead presents an aesthetically-pleasing and easily-cleaned piece of equipment in the footprint of a regular kitchen sink.

2. A Cabinet-Contained Reverse Osmosis System With and In-Cabinet Atmospheric Storage Tank, and a Remote Pressurized Auxiliary Storage Tank, for Storing Purified Water In another of its aspects, the present invention may be considered to concern the storage of purified water produced by a reverse osmosis system operating in the existing physical and plumbing and electrical environment of a kitchen, particularly a restaurant kitchen. The storage is in particular distinguished by a storage of purified water at atmospheric pressure locally to the reverse osmosis system in which the purified water is produced, with an auxiliary storage of purified water under pressure in a pressurized auxiliary storage tank at a location remote from the reverse osmosis system.

In this aspect the invention is embodied in a kitchen water station that receives supply water. The system includes a cabinet and at least one reverse osmosis membrane that is contained within the cabinet and flow connected to the supply water. The at least one reverse osmosis membrane serves to produce water that is purified by process of reverse osmosis.

An atmospheric storage tank is contained within the cabinet and flow connected to the reverse osmosis membrane(s). The atmospheric storage tank stores purified water at atmospheric pressure.

A delivery pump is contained within the cabinet and flow connected to the atmospheric storage tank. The delivery pump pressurizes purified water received from the atmospheric storage tank.

An auxiliary storage tank is external to the cabinet and flow connected to the delivery pump. The auxiliary storage tank stores purified water under pressure.

A faucet is mounted to the cabinet, flow connected to the atmospheric storage tank through the delivery pump, and also directly flow connected to the auxiliary storage tank. The faucet dispenses purified water under pressure;

By this construction storage of purified water transpires both (i) within the cabinet in the atmospheric storage tank at atmosphere pressure, and (ii) external to the cabinet in the auxiliary storage tank under pressure.

In greater detail, a lower level switch is located within the atmospheric storage tank for producing a "not-empty" signal when a level of purified water within the tank is less than a predetermined minimum level. A pressure switch is located within the flow connection between delivery pump and, in parallel, the faucet and the auxiliary storage tank. The pressure switch produces a "not-fully-pressurized" signal when a pressure of purified water within this flow connection is less than a predetermined maximum pressure.

An electrical control circuit controls the delivery pump to pressurize purified water from the atmospheric storage tank whenever the pressure switch indicates not-fully-pressurized" and the lower level switch indicates "not-empty".

By this control the delivery pump will pressurize purified water from the atmospheric storage tank whenever (i) the storage tank is "not-empty" and (ii) either the faucet is open, the auxiliary storage tank is not at the predetermined maximum pressure, or both the faucet is open and the auxiliary storage tank is not at the predetermined maximum pressure. Effectively, the delivery pump will operate whenever the flow connection is "not-fully-pressurized".

In still further detail, a booster pump boosts the pressure of the supply water supplied to the reverse osmosis membrane(s). An upper level switch within the atmospheric storage tank produces a "not-full" signal when a level of purified water within the tank is less than a predetermined maximum level.

Another electrical control circuit controls the delivery pump to boost the pressure of supply water supplied to the reverse osmosis membrane(s) whenever the upper level switch indicates "not-full".

By this control whenever the supply of purified water in the atmospheric storage tank is greater than "not-empty" the delivery pump will operate to store purified water under pressurize in the auxiliary storage tank until the predetermined maximum pressure is reached. Meanwhile the booster pump will cause purified water to be produced from supply water, and stored in the atmospheric storage tank, whenever the atmospheric storage tank is "not-full".

In combination the booster pump and the delivery pump operate so as to (i) bring the pressure of purified water stored in the auxiliary storage tank to maximum, meaning that the auxiliary storage tank is optimally full, and so as to (ii) bring the atmospheric storage tank to the maximum level.

2. A Reverse Osmosis System With Quick-Change Sediment Filters Changeable While the System is Operating In another of its aspects, the present invention may be considered to concern a reverse osmosis system having sediment filters that are changeable even while the reverse osmosis system continues to operate.

In this aspect the invention is embodied in a reverse osmosis system that receives supply water.

The reverse osmosis system includes at least one reverse osmosis membrane, and at least two flow paths in parallel between the received supply water and the at least one reverse osmosis membrane. Each flow path includes a sediment filter and a check valve.

A diverter valve serves to switch the received supply water to other than an un-selected one of the paths.

By this operation the sediment filter of the un-selected path is removable and replaceable without interrupting flow of supply water to the at least one reverse osmosis membrane. Normally there are two flow paths, each with a sediment filter and a check valve.

A diverter valve serves to switch the received supply water to other than an un-selected one of the paths.

By this operation the sediment filter of the un-selected path is removable and replaceable without interrupting flow of supply water to the at least one reverse osmosis membrane. Normally there are two flow paths, each with a sediment filter and a check valve.

These and other aspects and attributes of the present invention will become increasingly clear upon reference to the following drawings and accompanying specification.

BRIEF DESCRIPTION OF THE DRAWINGS

FIG. 1b is a side plan x-ray view showing the preferred embodiment of a compact water-conserving kitchen water cabinet with a sink in accordance with the present invention previously seen in FIG. 1a.

DESCRIPTION OF THE PREFERRED EMBODIMENT

Figure 1A:
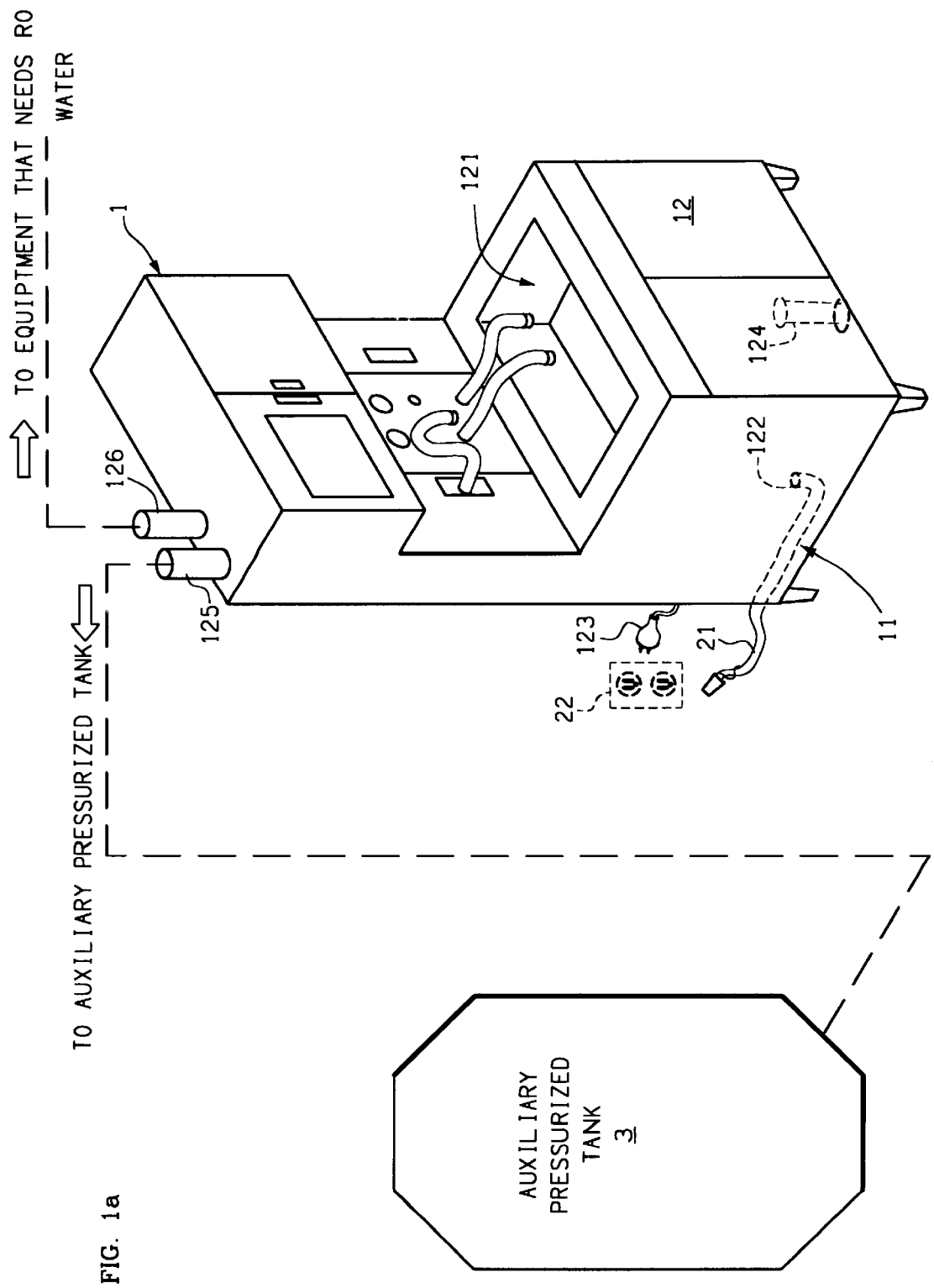
FIG. 1a is a diagrammatic perspective view showing the preferred embodiment of a compact water-conserving kitchen water cabinet with a sink in accordance with the present invention.
Figure 1B:
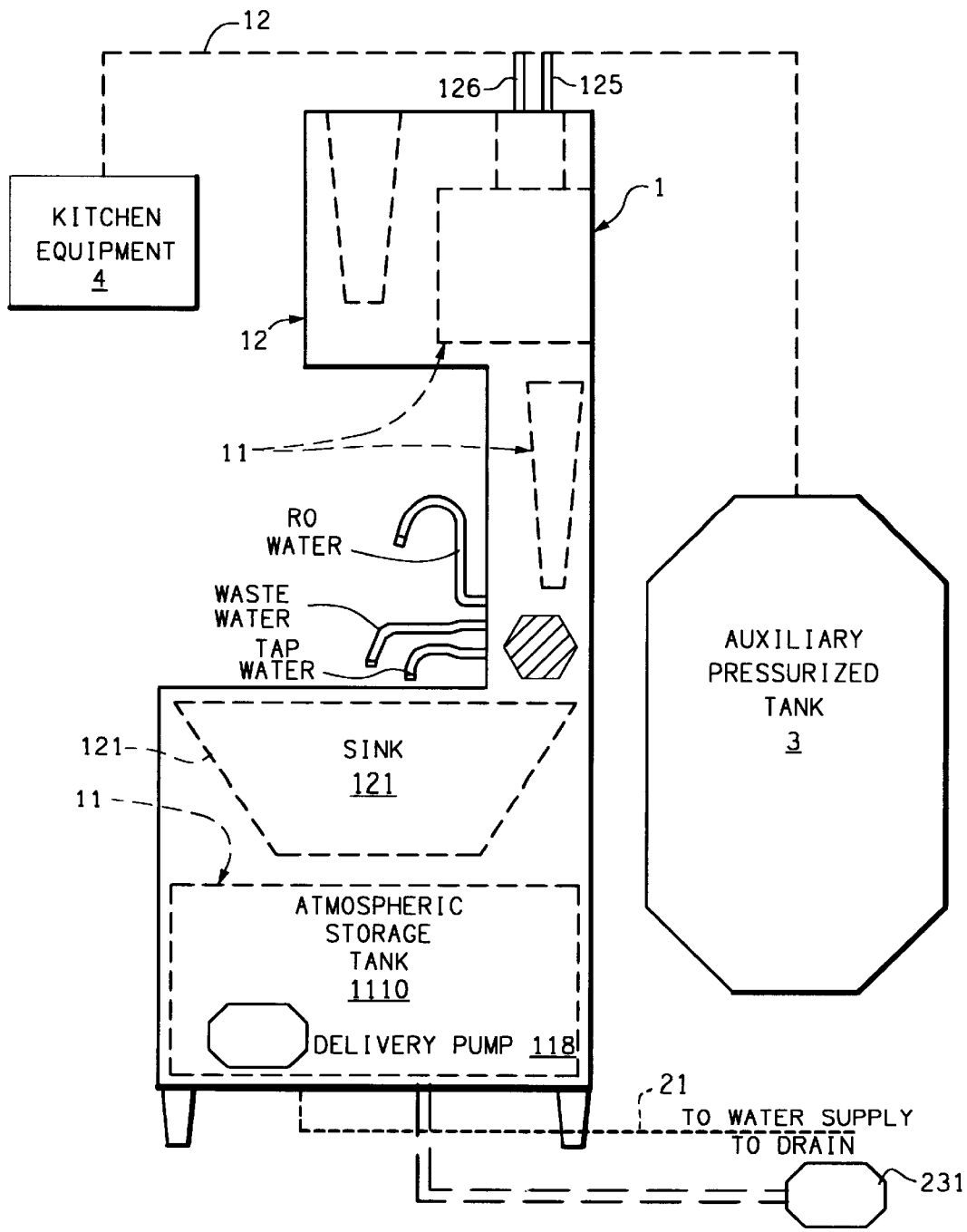

A preferred embodiment of a water station, or water cabinet, or water console 1 of the present invention having a complete reverse osmosis system 11 (hidden) contained in a cabinet 12 also having and presenting a sink 121 is shown in diagrammatic perspective view in FIG. 1a, and in side plan x-ray view in FIG. 1b. The water station 1 fits within the existing physical and plumbing and electrical environment of a kitchen, particularly a restaurant kitchen. The water station 1 normally fits within the floor "footprint" of, and in the airspace above, an existing kitchen sink, which it serves to completely replace.

The kitchen water station 1 receives supply water into the reverse osmosis system 11, normally at and by a plumbed connection 122 at the underside of the cabinet 12, through a normal supply, or tap, or municipal water plumbed water line 21 (shown in phantom line for not being part of the present invention). The kitchen water station 1 also receives electrical power, normally selectively either 100 v.a.c. to 220 v.a.c., 50–60 Hz., through a plug connection 123 to a standard power grid 22 (power grid shown in phantom line).

The kitchen water station 1, both in the elements of its reverse osmosis system 11 (hidden in FIG. 1a, partially exposed in x-ray view in FIG. 1b) and its sink 121, has a further flow connection to a drain system 23 for the evacuation of waste water. The drain system 23 is normally subsurface below a floor of the kitchen, and normally also includes a central drain vent 231 as is required by the building codes of most advanced countries.

The reverse osmosis system 11 (hidden in FIG. 1a, partially exposed in x-ray view in FIG. 1b) within the kitchen water station 1 has and offers—normally by typically two plumbing fittings 125, 126—plumbed connection (s) to a supply of purified water. Either of the plumbing fittings 125, 126 may be connected, for example, to an external, remotely-located, auxiliary purified water storage tank 3 (shown in dashed line for being optional). Alternatively, or additionally, either, or another, of the plumbing fittings 125, 126 may be connected, for example, to a kitchen appliance 4 using purified water, for example to a rice robot 4 (kitchen appliance 4 shown in phantom line for not being part of the present invention) or other kitchen equipment requiring purified water.

Figure 3:
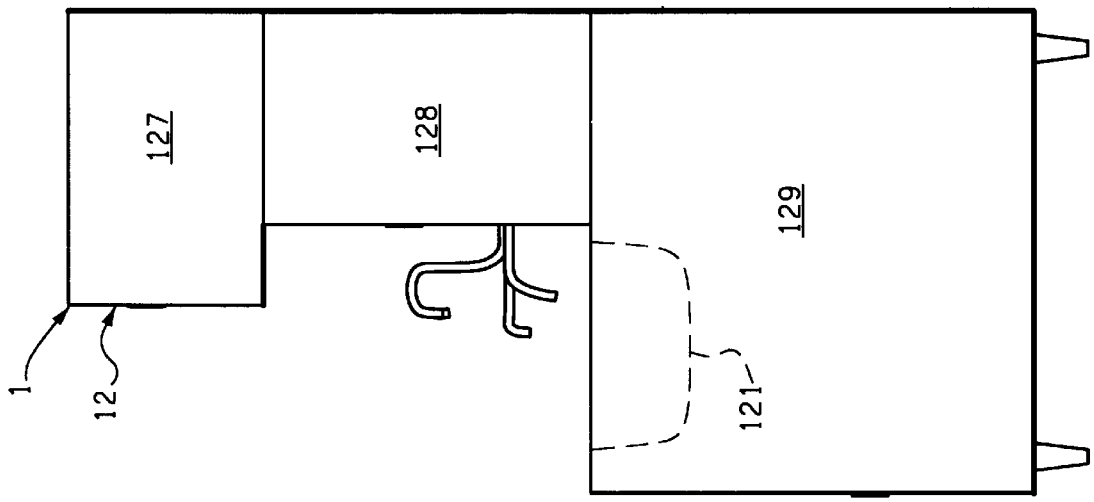
FIG. 3 is a side plan view of the preferred embodiment of the compact water-conserving kitchen water cabinet with a sink in accordance with the present invention previously seen in FIGS. 1a, 1b and 2.
Figure 2:
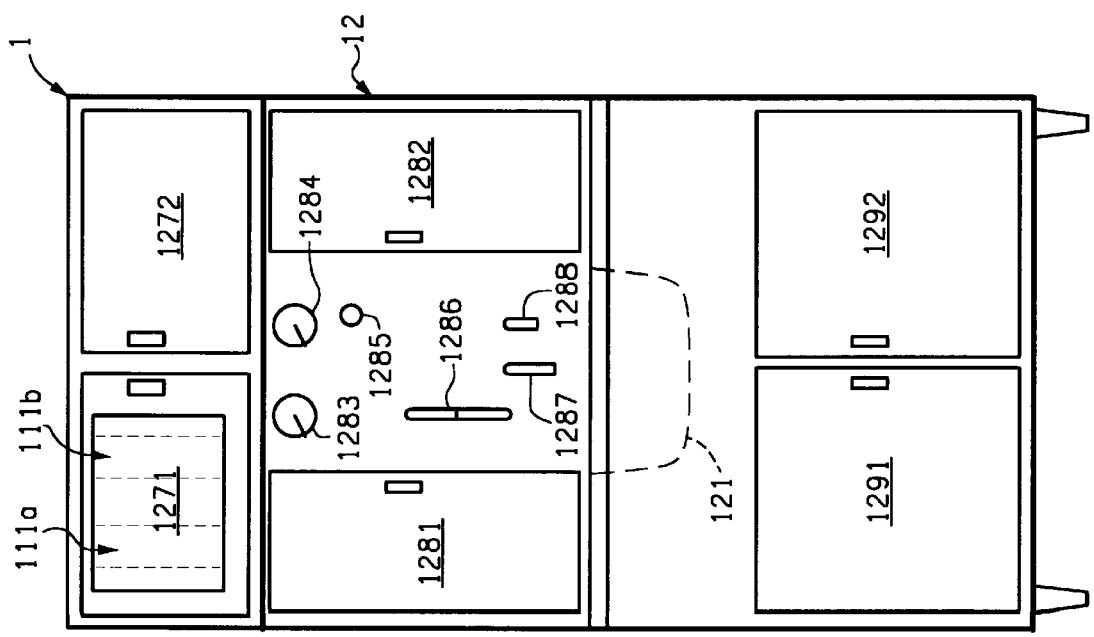
FIG. 2 is a front plan view of the preferred embodiment of the compact water-conserving kitchen water cabinet with a sink in accordance with the present invention, as was previously seen in FIGS. 1a and 1b.

Continuing in FIGS. 2 and 3, the cabinet 12 of the water station 1 is preferably constructed entirely of stainless steel, and is typically divided into three major sections: top section 127, middle section 128 and bottom section 129. The top section 127 preferably has two center-opening side-hinged opposed doors 1271, 1272. A large window behind which are visible the sediment filters 111a, 111b (shown in FIGS. 4–6) is present in one of the doors 1271, 1272, normally in left door 1271.

The middle section 128 also has two center-opening side-hinged opposed doors 1281, 1282. Two gauges 1283, 1284 as will further be shown in the schematic of FIG. 6 display the (manually adjustable) pressure on both sides of the reverse osmosis membranes 112, 113 (also shown in FIG. 6). An indicator light 1285, typically red in color, lights as an indication that an atmospheric storage tank 1110 (seen in FIGS. 4–6) is empty of purified water.

Three faucets 1286, 1287 and 1288 respectively provide water that is purified by reverse osmosis, waste water from the reverse osmosis process, and tap water (actually tap water that has been filtered by the sediment filters 111*a*, 111*b*). Each of the three faucets 1286–1288, as are preferably mounted to the middle portion 128 of the cabinet 12, drains into the basin of the sink 121 (which is itself defined by the lower portion 129 of the cabinet 12). The sink 121 thus remain unobstructed as is convenient for entering and exiting large dishes and pots, etc. to and from the sink 121, and for setting large trays and the like on the top surface of the middle section 128 of the cabinet 12.

Figure 5:
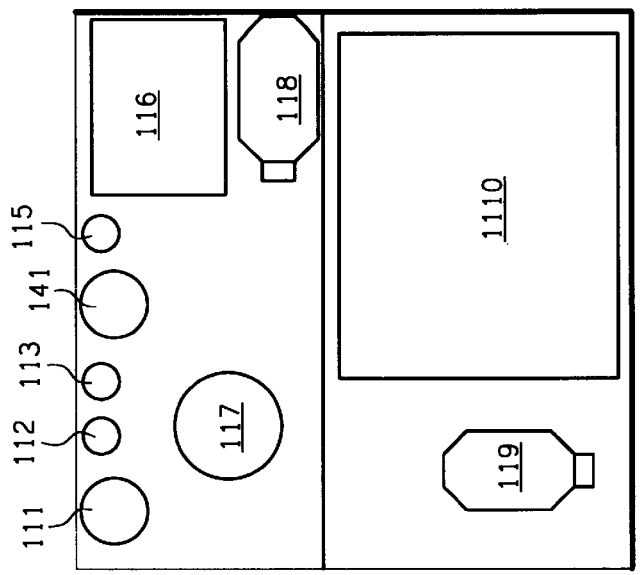
FIG. 5 is an x-ray top plan view of the preferred embodiment of the compact water-conserving kitchen water cabinet with a sink in accordance with the present invention.
Figure 4:
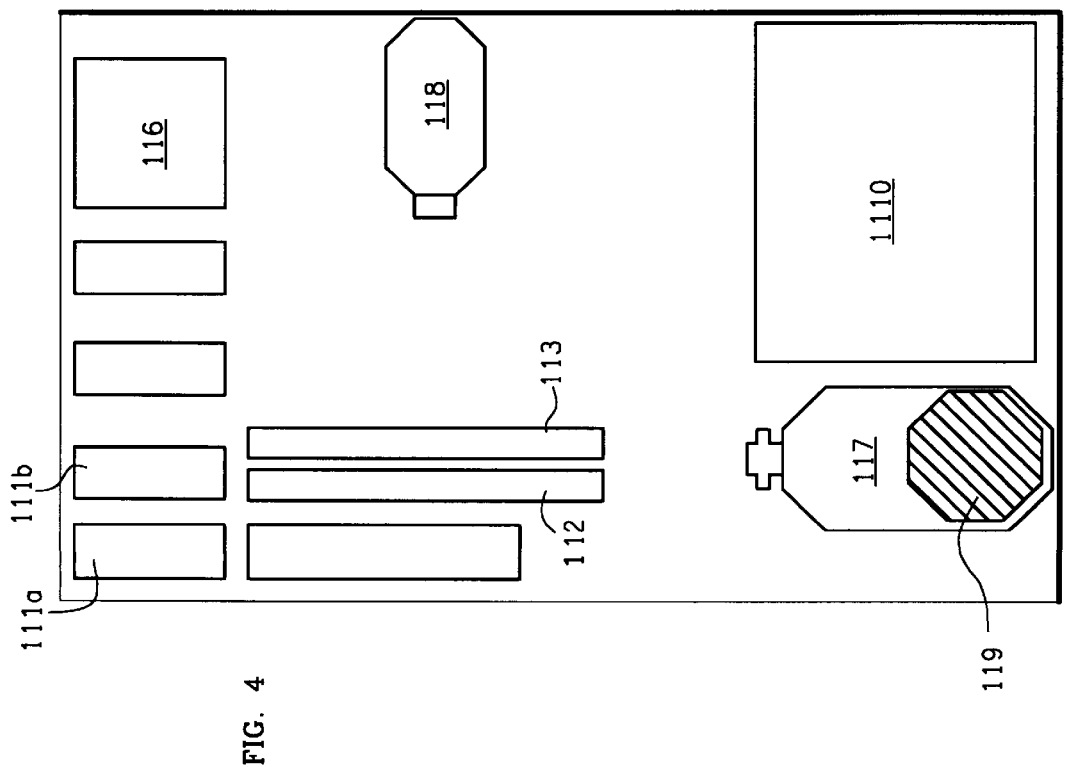
FIG. 4 is an x-ray front plan view, corresponding to FIG. 2, of the preferred embodiment of the compact water-conserving kitchen water cabinet with a sink in accordance with the present invention.
Figure 6:
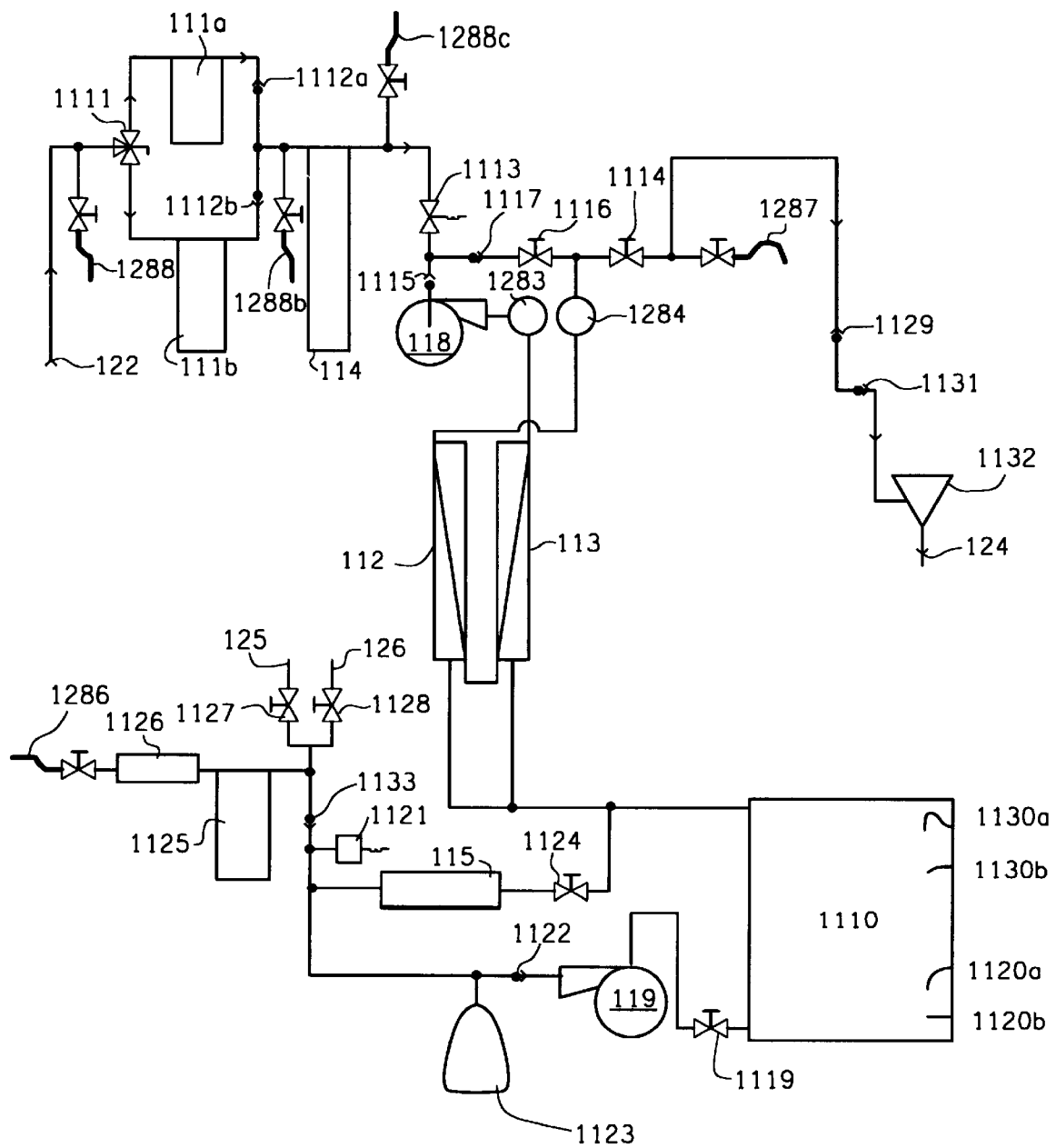
FIG. 6 is a combined mechanical and flow schematic diagram of the preferred embodiment of the compact water-conserving kitchen water cabinet with sink in accordance with the present invention previously seen in FIGS. 1a through 5.

The bottom section 129 also has two center-opening side-hinged opposed doors 1291, 1292, primarily for access to the atmosphere purified water storage tank 1110 and the delivery pump 1110, as will be shown in FIGS. 4–6.

X-ray front, and top, plan views of the preferred embodiment of the compact water-conserving kitchen water station 1 in accordance with the present invention are respectively shown in FIGS. 4 and 5. The illustrated layout is important for optimal compact packaging of the reverse osmosis system 11 entirely within the cabinet 12 (which itself fits within the footprint of an existing kitchen sink), and in order to provide convenient front access to the reverse osmosis system 11 for purposes of routine maintenance and emergency repair.

In particular, in the illustrated preferred embodiment of the water station 1, at least one filter, and preferably two filters 111*a*, 111*b* of received supply water are at least partially located in the top section 127, and/or the middle section 128, of the cabinet 12.

The middle portion 128 of the cabinet 12 contains at least a portion of at least one reverse osmosis membrane, and normally a portion of both of the preferred two reverse osmosis membranes 112, 113.

The bottom portion 129 of the cabinet 12 contains at least a portion of the storage tank 1110, as well as defining in a portion of its uppermost surface the sink 121 (best seen in FIGS. 1*a*–3).

Other physically large components of the reverse osmosis system 11 contained within the cabinet 12 are shown in their preferred locations in the x-ray views of FIGS. 4 and 5. A carbon block final filter 114 and an ultraviolet light 115—further to be seen in FIG. 6—are preferably mostly, or entirely, located in the top section 127 of the cabinet 12. Likewise, the control panel 116 for the reverse osmosis system 11 is also preferably located in the top section 127 of the cabinet 12 where it is conveniently accessible at eye level.

A booster pump 118 is preferably located in the middle section 128 of the cabinet 12. As will be better seen in FIG. 6, the booster pump 118 boosts the pressure of the supply water before its delivery to the reverse osmosis membranes 112, 113.

A bladder tank 117, and a delivery pump 119, are also preferably located in the bottom section 129 of the cabinet 12, along with the atmospheric storage tank 1110. The delivery pump 119 serves to pressurize purified water received from the atmospheric storage tank 1110 (as will further be seen in FIG. 6), and is thus desirably proximately located to the atmospheric storage tank 1110.

A combined mechanical and flow schematic diagram of the preferred embodiment of the compact water-conserving kitchen water cabinet 1 in accordance with the present invention is shown in FIG. 6. A bulk head adapter 122 (previously seen in FIGS. 1*a* and 1*b*), typically ½" in size, provides the external connection of the water cabinet 1, typically at the bottom of the lower section 129 of the cabinet 12, for connection to incoming feed water supply at an inconspicuous, but accessible, under-side location.

The feed water supply, or tap water, received through the bulk head adapter 122 may be immediately withdrawn for the tap water faucet 1288 (previously seen in FIGS. 2 and 3) mounted in faucet panel of the center section 128 of the cabinet 12 of he water station 1. This faucet 1288 permits using regular incoming feed water, or tap water, at the sink 121 (shown in FIGS. 1*a*–3). The faucet 1288 may alternatively be positioned (or yet another faucet may be added) at the position of faucet 1288*a*, shown in dashed line for being an option. At this position the dispensed water will have been preliminarily filtered in sediment filters 111*a*, 111*b* (discussed further hereinafter). Still further alternatively, the faucet 1288 may alternatively be positioned (or yet another faucet may be added) at the position of faucet 1288*b*, again shown in dashed line for being an option. At his position the dispensed water will have been both preliminarily filtered in sediment filters 111*a*, 111*b* and in secondary filter 114 (all discussed further hereinafter).

A two-way diverter valve 1111, typically ½" in size of brass construction, permits manual switching between each of the preferred two pre-sediment filters 111*a*, 111*b*. The sediment filters 111*a*, 111*b* are typically 10" in length, and 0.5 micron in porosity. They are each preferably housed in an associated clear filter housing made from plastic. Only one of these first stage, sediment, filters 111*a*, 111*b* is normally in service at any one time, the other sediment filter being in stand-by. The clear housings permit observation of the sediment filters 111*a*, 111*b*, which may be changed out and substituted for as throw-way disposable items when visibly dirty.

One-way check valves 1112*a*, 1112*b*, normally also ½" in size, permit incoming feed water to exit that one of the sediment filters 111*a*, 111*b* which is in current use, but does not allow incoming feed water to enter other one of the sediment filters 111*a*, 111*b* which is in stand-by.

Next in the flow of unpurified, supply, water a secondary filter 114, normally a 20" cylindrical filter of carbon, serves to remove chlorine and other chemicals from the incoming feed water supply. This second-stage filter 114 is housed in a 20" filter housing, which is, likewise to the housings of the sediment filters 111*a*, 111*b*, preferably opaque, and normally constructed of plastic.

An electric valve 1113, normally of ½" size normally operated by a solenoid of typical voltage 24 volts d.c./a.c., ensures positive shut down of incoming feed water supply to the reverse osmosis membranes 112, 113 when the atmospheric storage tank 1110 is full. This control will be more completely shown in the electrical schematic of FIG. 7.

A reverse osmosis (RO) booster pump 118 boosts the pressure of the filtered feed water for application to the preferred two RO membranes 112, 113. The booster pump 118 is preferably driven by a by ½ hp multi-voltage, dual hertz motor. The RO booster pump 118 serves to increase the incoming feed water pressure from normal line pressure to 150–200 PSI into the RO membranes 112, 113.

Figure 7:
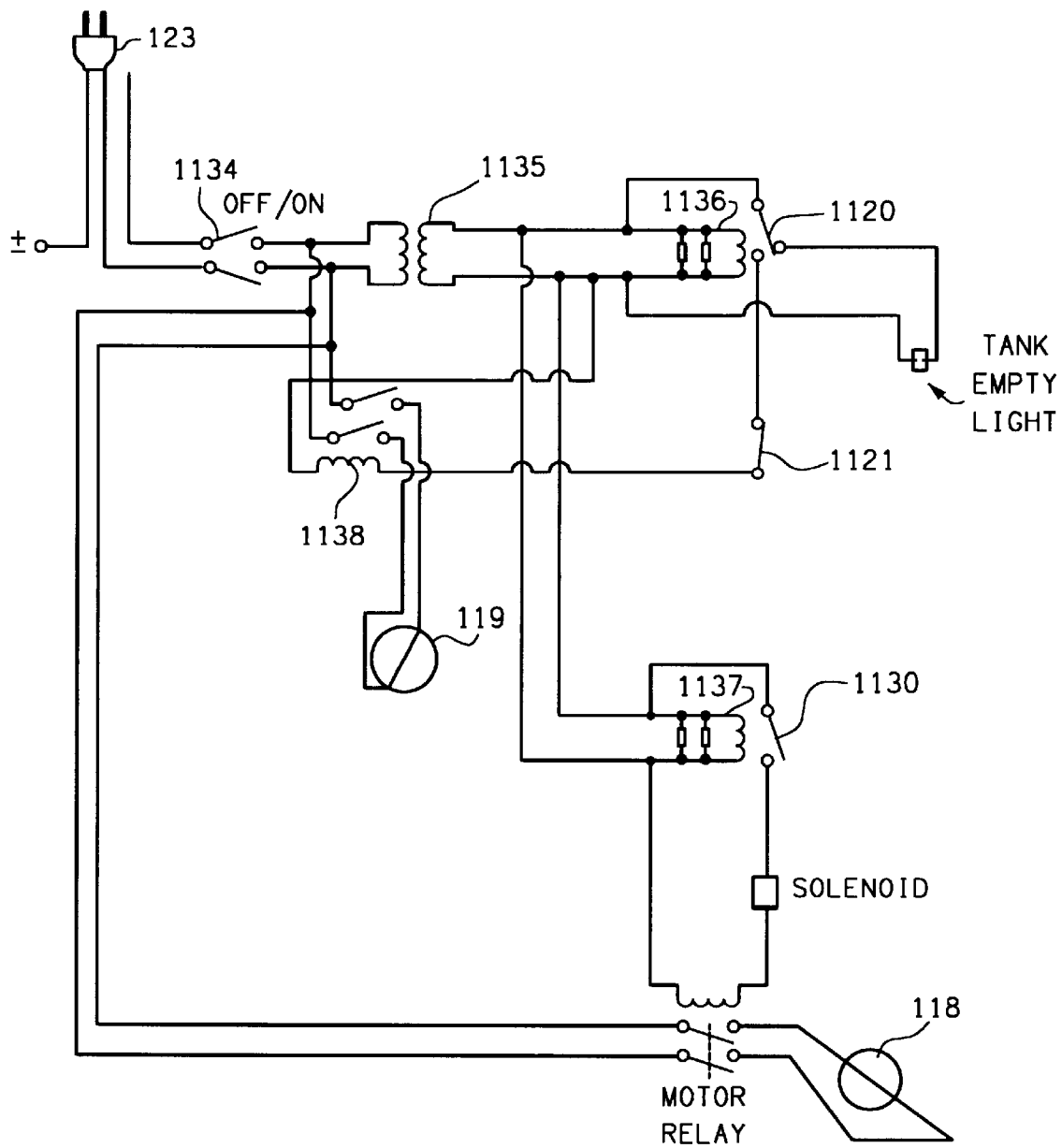
FIG. 7 is an electrical schematic diagram of the preferred embodiment of the compact water-conserving kitchen water cabinet with sink in accordance with the present invention previously seen in FIGS. 1a through 5.

Control of the RO booster pump 118 is dependent upon float switches 29 (A) & (B) mounted in the atmospheric storage tank 1110, as will be more completely shown in the electrical schematic of FIG. 7. Control of the RO booster pump 118 is for positive turn-on, or shut-down, based on detected water level in the storage tank 1110.

A panel-mounted pressure gauge 1283 (previously seen in FIG. 2), normally indicating in the range from 0 to 300 P.S.I., indicates the incoming water pressure into RO membranes 112, 113 after the RO booster pump 114.

Typically two (2) RO membranes 112, 113 are plumbed in series for up to 50% recovery rate. Each membrane 112, 113 is typically 2"×26" in size, and is housed in an appropriate membrane pressure vessel.

Another panel-mounted pressure gauge 1284 (previously seen in FIG. 2) again typically indicates in a range from 0 to 300 P.S.I., indicates the pressure drop across the RO membranes 112, 113.

A manually adjustable needle control valve 1114 permits the owner-operator to set and to control the brine waste water flow rate to the drain 124 (also shown in FIGS. 1a and 1b) by observing both the feed and back pressure readings on the 0–300 P.S.I. pressure gauges 1283, 1284 and the rate of production of purified, RO, water from the RO membranes 112, 113.

Another faucet 1287 permits, in accordance with the present invention, beneficial use of the RO waste, or "brine", water. This faucet 1287 is, as previously explained and shown in FIG. 2, preferably panel-mounted on the middle section 128 of the cabinet 12. By opening the faucet 1287 brine waste water from the membranes 112, 113 is diverted to be used in the sink 121 (shown in FIGS. 1a–3). A natural air gap break—which is required by UPC Plumbing codes—thereby is presented. Note that the level of the basin of the sink 121 is such that—even should the sink overflow drain (which flow connects directly to the subsurface floor drain 124 of the kitchen be improbably inoperative—water would overflow the basin of the sink 121, and onto the floor, before it would back up into the brine faucet 1287.

Brine waste water can be used for many applications.

In accordance with the present invention, a one-way check valve 1115, normally ⅜" in size, is used to ensure that no back flow transpires from the drain 124 (the basin of the sink 121) into the RO booster pump 118.

Further in accordance with the present invention, and as a major part of its water-conserving function, a brine waste water recycle valve 1116 is presented between the brine, or waste, water outlet of the RO membranes 112, 113 and the inlet of the booster pump 118. By opening the brine waste water recovery valve 116, brine waste water which would normally flow to the drain 124 (i.e., to the sewer) or to the "no-waste" brine faucet 1287 is instead fed back into the incoming feed water stream and repasses through the RO membranes 112, 113 for a higher recovery. By using this brine waste water recycling valve 1116 the RO rate recovery rate may be increased to 50%.

A one-way check valve 1117, normally ¼" in size, ensures that incoming feed water supply does not enter the brine waste water when the brine waste water recycling valve 1116 is in operation.

The RO, or purified, water is stored in an atmospheric storage tank 1110. The tank 1110 is preferably shaped and sized to fit in the lower portion 129 of the cabinet 12, and under the sink 121, of the water cabinet 1—all as previously shown and explained. In this manner all available space may be most efficiently used, and the manner the greatest amount of RO water may be stored.

The atmosphere purified water storage tank 1110 is designed for easy removal for cleaning. The lid of the tank 1110 permits the proper filling of, and the drawing of RO water from, the tank 1110 without trapping air. The lid also prevents foreign matter from entering the tank 1110.

A ball valve 1119, normally ½" in size, may be selectively shut off, preventing exit of water from the tank 1110, when desired.

RO water from the atmospheric storage tank 1110 is re-pressurized for delivery by a delivery pump 119. The pump 119 is preferably powered by a ½ hp multi-voltage dual hertz motor. The re-pressurization is desired to deliver the RO water at a good flow and pressure to any locations, including remote locations, which require RO water.

Control of the pump delivery 119 and its motor is responsive to the limit float switches 1120a, 1120b, as are more completely shown in the electrical schematic diagram of FIG. 7. Control of the delivery pump 119 is necessary to ensure the proper operation. When the atmospheric storage tank 1110 is empty of RO water, or if and when the RO water level drawn down to a level triggering the upper limit float switch 1120b, then the delivery pump 119 and its motor are disabled until the RO water level reaches a level triggering the lower limit float switch 1120a at which time the delivery pump 119 and its motor are activated. This is done to protect the delivery pump 119 from being operated in a dry mode. The delivery pump 119 and its motor are also controlled in accordance with dual pressure switch 1121 in order to ensure the delivery of water at a proper water pressure.

A one way check valve 1119 is presented in the flow connection between the outlet of the booster pump 119 and a diaphragm pressure water storage tank 1123 that is normally one (1) or two (2) gallons in volume. The purpose of the diaphragm pressure water storage tank 1123 is to permit proper operation of dual pressure switch 1121, and to ensure an even flow or RO purified water.

The dual pressure switch 1121 has a −20 psi differential setting between off and on points. This switch 1121 is used in the control of the delivery pump 119 and its motor in order to ensure proper RO water pressure, and even flow, to external equipments.

The purified water in the atmospheric storage tank 1110 is preferably continuously cycled so as to undergo disinfection by being sterilized with ultraviolet in ultraviolet light source 115. The purified water is preferably recirculation from the storage tank 1110 through the ultraviolet light source 115 continuously, and twenty-four (24) hours a day. The ultraviolet light source 115 constitutes a fourth purification stage.

A flow restrictor 1124 serves to regulate and to ensure that the total volume of purified water held in the atmospheric storage tank 1110 will be recirculated through the ultraviolet light source 115 each twenty-four (24) hours.

A fifth purification stage is realized by a final polishing filter 1125. This filter 1125 is preferably a 10" carbon block.

A final, sixth, purification stage is realized by sub-micron filter 1126. This filter 1126 is principally for added protection.

The faucet 1286 (previously seen in FIGS. 2 and 3) serves as the outlet for purified, RO, water. It is panel-mounted so as to be above the basin of the sink 121 of the water station 1.

Preferably two (2) ball valves 1127, 1128, each preferably of ½" size, are preferably mounted to the top panel of the uppermost portion 127 of the cabinet 12 of the water station 1. The valves 1127, 1128 serve to gate water through outlet fittings 125, 126 (previously seen in FIGS. 1*a* and 1*b*) that are normally also of ½" size. The preferred two outlet connections permit purified, RO, water to be plumbed to any equipment or additional pressurized storage tank, including as may be located remotely.

A one-way check valve 1129 permits brine waste water to flow to the drain 124 if the brine water "no waste" faucet 1287 is in a closed position, or if this brine water "no waste" faucet 1287 is open insufficiently so as to permit the full flow of all brine waste water to the sink 121. Any diverted brine waste water which is not flowed to the sink 121 instead flows directly to the drain 124. The one way check valve 1129 also ensures that no additional back pressure is put on the RO membranes 112, 113.

The crack pressure setting of the check valve 1129 also insures if all brine waste water is dispensed at the brine water "no waste" faucet 1287 then no waste water at all is permitted to flow directly to the drain 124. The check valve 1129 thus prevents waste water from the drain from undesirably back-flowing into the system if the drain 124 becomes plugged and backs up.

The RO float switches 1130*a*, 1130*b* shut down both RO booster pump 118 and its motor when, and because, the storage tank 1110 is full. Float switch 1120*b* turns on the RO booster pump 118 when, and because, the water volume in the storage tank 1110 has dropped to a level that requires the production of RO water.

The motor safety switch 1130*a* turns on the motor of the delivery pump 119. When the RO water level in the atmospheric storage tank 1110 is at a level which is safe then the delivery pump 119 and its motor are turned on so as to pressurize the RO lines and the filter 115. The delivery pump 119 and motor safety switches 1130*a*, 1130*b* will, however, preclude that the atmospheric storage tank 1110 should be run dry. Namely, the delivery pump 119 and motor safety switches 1130*a*, 1130*b* combine to shut down the delivery pump 119 just at the point before the RO water level in the atmospheric storage tank 110 would cause the delivery pump 119 to run dry.

Note an air break and drain overflow 1131 of the sink 121. This again serves to prevent backup. The drain connection 1132 is at the bottom of the sink 121 of the water station 1.

A one-way check valve 1133 ensures that the atmospheric storage tank 1110 does not overflow if a remote pressurized storage tank 3 (not shown in FIG. 6, shown in FIGS. 1*a* and 1*b*) is used down-stream on the output RO water line for additional storage of RO water.

An electrical schematic diagram of the preferred embodiment of the compact water-conserving kitchen water cabinet 1 in accordance with the present invention is shown in FIG. 7. The power grid supply power received through plug 123 is gated through on/off switch 1134 and transformed to 24 v.a.c. in transformer 1135. The transformed voltage supply power to tank empty relay 1136, tank full relay 1137, and motor relay 1138.

In operation, the lower level switch 1120*a* located within the atmospheric storage tank 1110 produces a "not-empty" signal when a level of purified water within the tank 1110 is less than a predetermined minimum level. The pressure switch 1121 is located within the flow connection between delivery pump 119 and, in parallel, the purified water faucet 1286 and the auxiliary storage tank 4, as may be remembered by momentary reference to FIGS. 1*a*, 1*b* and 6. The pressure switch 1121 produces a "not-fully-pressurized" signal when a pressure of purified water within this flow connection is less than a predetermined maximum pressure.

The electrical control circuit shown in FIG. 7 operates to control the delivery pump 119 to pressurize purified water from the atmospheric storage tank 1110 (shown in FIGS. 2–6) whenever both the pressure switch 1121 indicates not-fully-pressurized", and also the lower level switch 1120 indicates "not-empty".

By this control the delivery pump 119 will pressurize purified water from the atmospheric storage tank 1110 (shown in FIGS. 2–6) whenever (i) the storage tank 1110 is "not-empty" and/or the faucet 1286 (shown in FIGS. 2 and 6) is open. Effectively, the delivery pump 119 will operate whenever the flow connection is "not-fully-pressurized".

The booster pump 118, also shown in FIGS. 2, 3 and 6, will be remembered to boost the pressure of the supply water supplied to the reverse osmosis membranes 112, 113 (shown in FIGS. 2–6). The upper level switch 1130 within the atmospheric storage tank 1110 produces a "not-full" signal when a level of purified water within the tank 1110 is less than a predetermined maximum level. This signal is used to gate power through the (booster pump) motor relay 1137 to cause the delivery pump 118 to boost the pressure of supply water supplied to the reverse osmosis membranes 112, 113 whenever the upper level switch 1130 indicates "not-full".

By this control whenever the supply of purified water in the atmospheric storage tank 1110 is greater than "not-empty" then the delivery pump 119 will operate to store purified water under pressure in the auxiliary storage tank 1110 until the predetermined maximum pressure is reached. Meanwhile the booster pump 118 will cause purified water to be produced from supply water, and stored in the atmospheric storage tank 1110, whenever the atmospheric storage tank 1110 is "not-full".

In combination the booster pump 118 and the delivery pump 119 operate so as to (i) bring the pressure of purified water stored in the auxiliary storage tank 1110 to maximum, meaning that the auxiliary storage tank 1110 is optimally full, and so as to (ii) bring the level of purified water in the atmospheric storage tank 1110 to maximum.

The preferred operational parameters of the preferred embodiment of the water station 1 in accordance with the present invention are as follows. The standard operating pressure is 150 psig @ 77° F., producing 600 gallons of purified (RO) water per day (equivalently, 10.2 bars @ 25° C., for 2293 liters per day). Meanwhile, the maximum operating pressure is 200 psig @ 77° F. producing 800 gallons per day (equivalently, 13.8 bars @ 25° C. producing 3061 liters per day).

The recovery rate is a minimum of 30%, and a maximum of 50%.

The maximum operating pressure is 200 psig (13.8 bars)

The feed silt density index (15 minutes) is less than 5.

The pH Range is from 3 to 1.

The minimum feed water temperature is 40° F. (40° C.). The maximum feed water temperature is 100° F. (37.5° C.).

The minimum feed water pressure is 10 psig (0.7 bars). The maximum feed water pressure is 100 psig (6.9 bars).

The maximum feed water hardness $CoCa^3$ is 7 grains per gallon (120 ppm). The maximum feed water iron content is 0 ppm. The maximum total dissolved solids (TDS) in the feed water is 3000 ppm.

The RO booster pump 118 is preferably a brass rotary vane carbon pump serving to pump 416 liters per hour @ 1725 rpm. The SS delivery pump 119 is preferably a stainless steel rotary valve carbon pump serving to deliver 908 liters per hour @ 50 psig @ 1725 rpm. The motor for each pump 118, 119 is preferably a ½ hp clamp on carbonator motor selectively operating at an input voltage of either 100–120 v.a.c., or 208–230 v.a.c., at 50–60 Hz. The required current is 7.8 amperes at 100–120 v.a.c., or 3.9 amperes at 208–230 v.a.c.

A contained electrical outlet is normally fused for 30 amperes at 100–120 v.a.c., or for 20 amperes at 208–230 v.a.c.

The preferred inlet port sizes are ½" N.F.P.T. The preferred drain Outlet is 1–½". The RO port outlets 125, 126 are preferably ½" N.F.P.T.

According to the preceding explanation, the present invention will have been seen to be embodied in a kitchen water station that receives supply water. The system includes a cabinet 12 and at least one reverse osmosis membrane 112, 113 that is contained within the cabinet 12 and flow connected to the supply water. The at least one reverse osmosis membrane 112, 113 serves to produce water that is purified by process of reverse osmosis. An atmospheric storage tank 1110 contained within the cabinet 12 and flow connected to the reverse osmosis membrane(s) 112, 113 stores purified water at atmospheric pressure.

A delivery pump 119 contained within the cabinet is flow connected to the atmospheric storage tank 1100, and pressurizes purified water received from this tank. An optional auxiliary storage tank 3 external to the cabinet may also be flow connected to the delivery pump 119. The auxiliary storage tank 3 will then store purified water under pressure.

When both the atmospheric storage tank 1110 and the auxiliary storage tank 3 (shown in FIGS. 1a and 1b) are full, then purified water is first dispensed by the faucet 1286 from the full auxiliary storage tank 3 under pressure. Moreover, purified water in the auxiliary storage tank 3 that has been pressurized by operation of the delivery pump 119 will be dispensed under pressure without necessity of further operation of the delivery pump 119.

A faucet 1286 mounted to the cabinet 12 is flow connected to the atmospheric storage tank 1110 through the delivery pump 119, and is also directly flow connected to the auxiliary storage tank
3. This faucet 1286 thus serves to dispense purified water under pressure. By this construction storage of purified water transpires both (i) within the cabinet 12 in the atmospheric storage tank 1110 at atmosphere pressure, and (ii) external to the cabinet 12 in the auxiliary storage tank 4 under pressure.

Notably, and further, the sediment filters 111a, 111b of the reverse osmosis system 11 of the water station 1 are changeable even while the reverse osmosis system 11 continues to operate. This is enabled because the reverse osmosis system 11 includes at least one reverse osmosis membrane 112, 113, and at least two flow paths in parallel between the received supply water and the at least one reverse osmosis membrane 112. Each flow path includes a sediment filter (111a or 111b) and a check valve (1112a or 1112b). A diverter 1111 valve serves to switch the received supply water to other than an un-selected one of the paths. By this operation the sediment filter of the un-selected path is removable and replaceable without interrupting flow of supply water to the at least one reverse osmosis membrane.

In accordance with the preceding explanation, variations and adaptations of the water station in accordance with the present invention will suggest themselves to a practitioner of the reverse osmosis system design arts. For example, an accommodation could be made to the plumbing, and the use, of both hot and cold water.

In accordance with these and other possible variations and adaptations of the present invention, the scope of the invention should be determined in accordance with the following claims, only, and not solely in accordance with that embodiment within which the invention has been taught.

What is claimed is:

1. A kitchen water station, receiving supply water, comprising:

a reverse osmosis system including
a filter of received supply water for producing filtered supply water,
at least one reverse osmosis membrane receiving filtered supply water from the filter for producing water purified by reverse osmosis and waste water, and
a storage tank receiving the purified water from the membrane for storing the purified water;

a cabinet including
a top portion,
a middle portion, connected to the top portion,
wherein at least a portion of the filter, and at least a portion of the at least one reverse osmosis membrane, are both contained in at least one of the top portion and the middle portion, and
a bottom portion, connected to the middle portion and containing at least a portion of the storage tank, defining in a portion of its uppermost surface that is not connected to the middle portion a sink basin;
wherein at least a portion of both the filter, and the at least one reverse osmosis membrane are, by dint of being at least partly contained in top and middle portions of the cabinet, located above at least that at least part of the storage tank that is within the bottom portion of the cabinet;

a first faucet, flow connected to the reverse osmosis membrane, for dispensing waste water over the sink basin; and a second faucet, flow-connected to the storage tank, for dispensing purified water over the sink basin.

2. The kitchen water station according to claim 1 further comprising:
a third faucet, flow-connected to the supply water, for dispensing supply water over the sink basin.

3. The kitchen water station according to claim 2 wherein the third faucet is flow-connected to the supply water through the filter, and is thus dispensing filtered supply water over the sink basin.

4. The kitchen water station according to claim 2
wherein each of the first, the second, and the third faucet are mounted to the middle portion of the cabinet;
wherein an upper surface of the sink basin defined by the bottom portion of the cabinet is unobstructed by any mounting of any faucet.

5. The kitchen water station according to claim 1 wherein the reverse osmosis system further comprises:
a booster pump for boosting the pressure of the supply water before delivery to the reverse osmosis membrane;
wherein the cabinet's middle portion also contains at least a portion of the booster pump.

6. The kitchen water station according to claim 1 wherein the reverse osmosis system further comprises:
a delivery pump for pressuring purified water received from the membrane for storage under pressure in the storage tank;
wherein the cabinet's bottom portion also contains at least a portion of the delivery pump.

7. The kitchen water station according to claim 1 further comprising:

a plumbing outlet connection flow-connected to the storage tank for supplying purified water outside the cabinet.

8. The kitchen water station according to claim 7 cooperatively interactive with a rice washing and cooking appliance wherein the plumbing outlet connection flow-connected to the storage tank supplies purified water to the rice washing and cooking appliance.

9. The kitchen water station according to claim 7 cooperatively interactive with an auxiliary purified water storage tank wherein the plumbing outlet connection flow-connected to the storage tank supplies purified water to the auxiliary purified water storage tank.

10. The kitchen water station according to claim 1 wherein the storage tank comprises:

an atmospheric storage tank;

wherein because the at least one reverse osmosis membrane is, by dint of being at least partly contained in top and middle portions of the cabinet, located above at least that part of the atmospheric storage tank that is within the bottom portion of the cabinet, purified water from the at least one reverse osmosis membrane will flow to the atmospheric storage tank by force of gravity.

11. A kitchen water station, receiving supply water, comprising:

a cabinet;

a reverse osmosis membrane, contained within the cabinet and flow connected to the supply water, for producing water that is purified by process of reverse osmosis from received supply water;

an atmospheric storage tank, contained within the cabinet and flow connected to the reverse osmosis membrane, for storing purified water at atmospheric pressure;

a delivery pump, contained within the cabinet and flow connected to the atmospheric storage tank, for pressurizing purified water received from the atmospheric storage tank;

an auxiliary storage tank, external to the cabinet and flow connected to the delivery pump, for storing purified water under pressure; and a faucet, mounted to the cabinet, flow connected to the atmospheric storage tank through the delivery pump, and also directly flow connected to the auxiliary storage tank, for dispensing purified water under pressure;

wherein storage of purified water transpires both (i) within the cabinet in the atmospheric storage tank at atmosphere pressure, and (ii) external to the cabinet in the auxiliary storage tank under pressure.

12. The kitchen water station according to claim 11 further comprising:

a lower level switch within the atmospheric storage tank for producing a "not-empty" signal when a level of purified water within the tank is more than a predetermined minimum level;

a pressure switch within the flow connection between, on a one side, the delivery pump and, on the other side as two items flow-connected in parallel, the faucet and the auxiliary storage tank, for producing a "not-fully-pressurized" signal when a pressure of purified water within the flow connection is less than a predetermined maximum pressure;

means for controlling the delivery pump to pressurize purified water from the atmospheric storage tank whenever the pressure switch indicates not-fully-pressurized" and the lower level switch indicates "not-empty";

wherein the delivery pump will be controlled to pressurize purified water from the atmospheric storage tank whenever (i) the storage tank is "not-empty", and (ii) either the faucet is open, the auxiliary storage tank is not at the predetermined maximum pressure, or both the faucet is open and the auxiliary storage tank is not at the predetermined maximum pressure, which does cause the flow connection to be "not-fully-pressurized".

13. The kitchen water station according to claim 12 further comprising:

a booster pump for boosting the pressure of the supply water supplied to the reverse osmosis membrane; and an upper level switch within the atmospheric storage tank for producing a "not-full" signal when a level of purified water within the tank is less than a predetermined maximum level;

means for controlling the booster pump to boost the pressure of supply water supplied to the reverse osmosis membrane whenever the upper level switch indicates "not-full";

wherein, supply of purified water in the atmospheric storage tank being greater than "not-empty", the delivery pump will operate to store purified water under pressurize in the auxiliary storage tank until the predetermined maximum pressure is reached while the booster pump will be controlled to cause purified water to be produced from supply water, and stored in the atmospheric storage tank, whenever the atmospheric storage tank is "not-full";

wherein the booster pump, and the delivery pump, are jointly controlled to operate so as to (i) bring the pressure of purified water stored in the auxiliary storage tank to maximum, meaning that the auxiliary storage tank is optimally full, and (ii) bring the atmospheric storage tank to the maximum level.

14. The kitchen water station according to claim 12 wherein when both the atmospheric storage tank and the auxiliary storage tanks are full, then purified water is first dispensed by the faucet from the full auxiliary storage tank under pressure.

15. The kitchen water station according to claim 12 wherein purified water in the auxiliary storage tank pressurized by operation of the delivery pump will be dispensed under pressure without necessity of further operation of the delivery pump.

16. The kitchen water station according to claim 11 further comprising:

a booster pump for boosting the pressure of the supply water supplied to the reverse osmosis membrane; and an upper level switch within the atmospheric storage tank for producing a "not-full" signal when a level of purified water within the tank is less than a predetermined maximum level;

means for controlling the booster pump to boost the pressure of supply water supplied to the reverse osmosis membrane whenever the upper level switch indicates "not-full";

wherein the booster pump will be controlled to cause purified water to be produced from supply water, and stored in the atmospheric storage tank, whenever the atmospheric storage tank is "not-full".

* * * * *